United States Patent [19]

Henkelmann

[11] 4,343,769

[45] Aug. 10, 1982

[54] CATALYTIC SOLVENT VAPOR INCINERATING APPARATUS

[75] Inventor: Gary L. Henkelmann, Green Bay, Wis.

[73] Assignee: W. R. Grace & Co., New York, N.Y.

[21] Appl. No.: 177,065

[22] Filed: Aug. 11, 1980

[51] Int. Cl.³ .................... G05D 23/22; F01N 3/10; B01J 8/00

[52] U.S. Cl. ........................ 422/109; 34/26; 34/32; 34/72; 34/54; 110/210; 422/111; 422/115; 422/169; 422/180

[58] Field of Search .............. 422/62, 109, 111, 115, 422/168, 169, 173, 174, 180; 423/210 R, 210 C, 212, 213.7; 110/187, 210, 190, 214; 101/416 R, 416 A, 416 B, 417; 34/26, 27, 32, 79, 80, 72, 54

[56] References Cited

U.S. PATENT DOCUMENTS

| | | | |
|---|---|---|---|
| 3,314,159 | 4/1967 | Betz | 34/72 |
| 3,395,972 | 8/1968 | Hardison | 422/169 |
| 3,486,841 | 12/1969 | Betz | 422/109 |
| 3,806,322 | 4/1974 | Tabak | 422/180 |

*Primary Examiner*—Michael S. Marcus
*Attorney, Agent, or Firm*—James E. Nilles

[57] ABSTRACT

Gas consisting of air mixed with varying concentrations of solvent vapors, drawn from a dryer, is passed through controllable heating means to a catalyst bed. In flow through the catalyst bed, for oxidation of the vapors, temperature rise of the gas depends upon solvent concentration. For control of the heating means, so that gas at the bed inlet will have a temperature high enough for complete vapor oxidation but not so high as to be unnecessarily hot at the bed outlet, thermocouples are located to sense gas temperature at the bed inlet and outlet. Like terminals of the thermocouples are connected to opposite ends of a potentiometer resistance element; its slider is connected with a comparison device that compares the potentiometer output (corresponding to a weighted average of bed inlet and outlet temperatures) with a demand value. The heating means consists of a controllable fuel burner and a heat exchanger wherein hot gas from the catalyst bed can heat gas flowing to the burner. Some, all, or none of the gas flowing to the burner can be controllably bypassed around the heat exchanger. A constant-volume fan is located between the blower and the catalyst bed inlet so that mass flow rate through it tends to increase with increasing vapor concentration.

8 Claims, 1 Drawing Figure

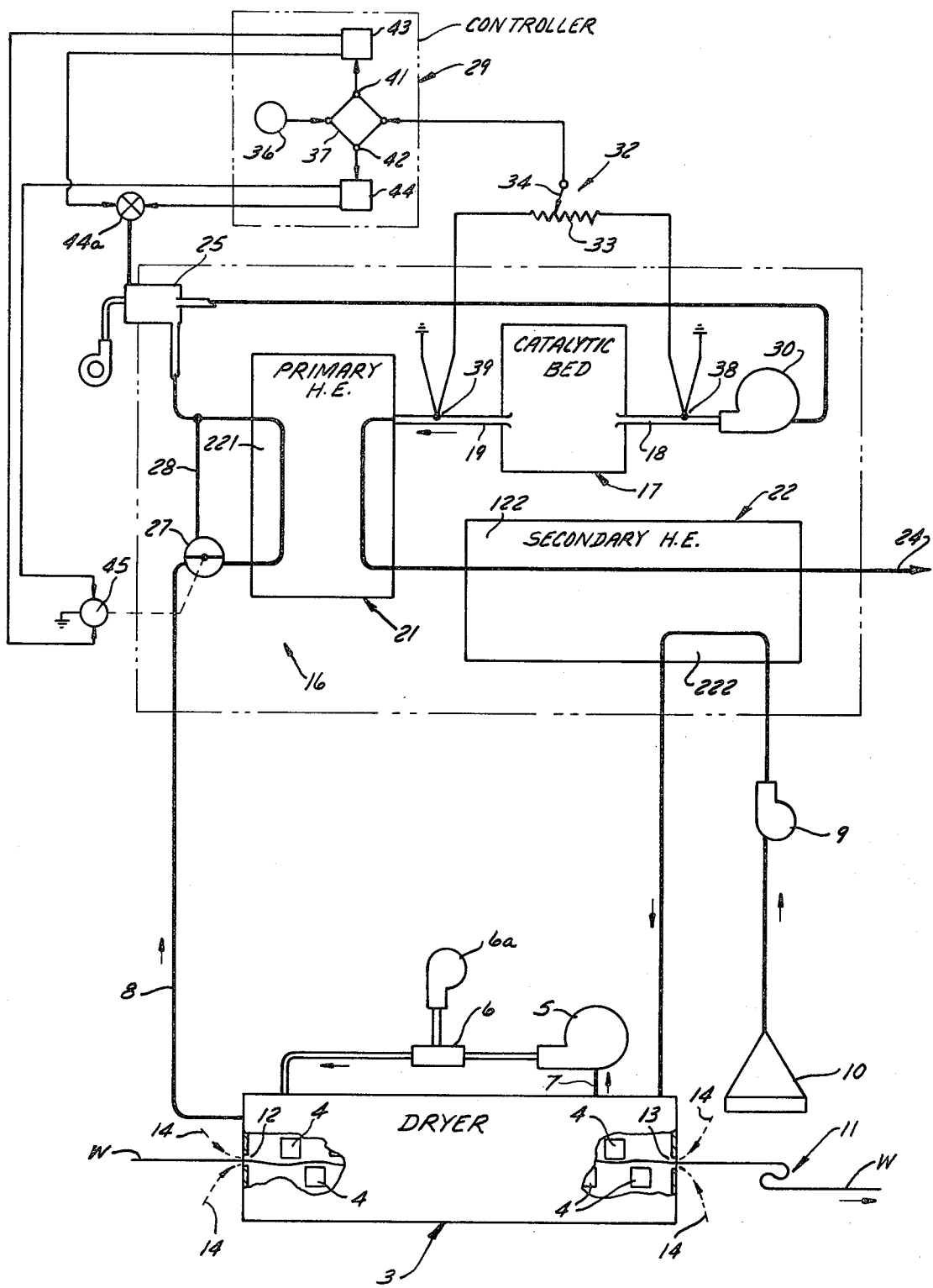

CATALYTIC SOLVENT VAPOR INCINERATING APPARATUS

FIELD OF THE INVENTION

This invention relates to vapor incinerating apparatus wherein a gas stream of mixed air and combustible solvent vapors, drawn out of a dryer, is heated to a suitable temperature and is then passed through a catalyst bed for oxidation of the solvent vapors; and the invention is more particularly concerned with means in such apparatus for so controlling the temperature of the gas stream entering the catalyst bed as to assure substantially complete oxidation of solvent vapors in the course of flow of the gas stream through the bed while nevertheless preventing temperatures in the bed from rising to values higher than necessary for such oxidation, and whereby such control is maintained notwithstanding large and unpredictable variations in the concentration of solvent vapors in the gas stream.

BACKGROUND OF THE INVENTION

Solvent vapor incineration apparatus of the type to which this invention relates is typically employed in connection with a web printing operation wherein combustible solvent vapors are given off from the web as it passes through a dryer enclosure just after being imprinted. Combustion or oxidation of such solvent vapors is necessary for the avoidance of air pollution and is also a safety measure, to prevent vapor concentrations in the dryer from reaching an explosive level. In the dryer, heated air is blown against the web to expedite the drying process, and exhaust air mixed with solvent vapors is drawn out of the dryer into a duct that conducts it to the incineration apparatus.

In the incineration apparatus, substantial energy efficiency is realized by effecting oxidation of the solvent vapors in a catalyst bed. In order for such catalytic incineration to take place, the gas stream of exhaust air and solvent vapors must be heated by means of a fuel burner before it is delivered to the catalyst bed, but the temperature to which the gas must be heated is well below the kindling point of most of the solvent vapors, although higher than the temperature of the air blown into the dryer. A significant portion of the heat generated by and for oxidation of the solvent vapors can be reclaimed from the hot gas issuing from the catalyst bed by passing that gas through a pair of heat exchangers, one for heating the incoming gas stream flowing towards the fuel burner and the other for heating air flowing towards the dryer.

It is well known that the temperature of the gas stream entering the catalyst bed must be so controlled as to be kept within certain limits. It must be high enough to ensure that complete oxidation of the solvent vapors will occur in the course of flow through the catalyst bed, but it should not be substantially higher, for otherwise there is a waste of fuel in the unnecessary heating of the gas stream before it enters the catalyst bed. In an extreme case a heat exchanger could be damaged by excessive temperature of gas issuing from the catalyst bed.

It is not unduly difficult to maintain a given gas stream temperature at the inlet to the catalyst bed. The temperature there depends upon the amount of heat energy in the gas stream leaving the dryer and the amounts of heat energy that are added to the gas stream at the heat exchanger and the fuel burner which preheat the gass for its delivery to the catalyst bed.

However, the problem that has heretofore confronted the art was not how to maintain a given temperature at the inlet to the catalyst bed, but what temperature to maintain there under any given conditions.

The optimum temperature to be maintained at the inlet to the catalyst bed is not a constant value but is a variable which depends upon the relative concentration of solvent vapors in the gas stream, and that concentration, in turn, is subject to very substantial and more or less unpredictable variation. By way of example, with a low solvent concentration in the gas stream, a temperature of 700° F. at the inlet to the catalyst bed might result in maintenance through the whole bed of a temperature not much over 700° F., due to the low heat release from oxidation of the small amount of solvent in the gas, but this temperature in the bed would be high enough to effect complete combustion of the solvent at a low concentration. However, if there were to be a substantial increase in solvent concentration without change in the 700° F. inlet temperature, there would be a substantially greater heat release in the catalyst bed, due to the higher rate of combustion of solvent, and the temperature of the gas issuing from the catalyst bed would be much higher than necessary.

From the foregoing example it might seem as if the temperature of the gas stream at the inlet to the catalyst bed could be controlled by reference to the temperature of the gas at the outlet from the bed. However, if inlet temperature were controlled to maintain a constant outlet temperature set point, a set point suitable for a low solvent concentration would be too low for a higher solvent concentration. With a low solvent concentration the gas stream undergoes only a small temperature rise as it flows through the catalyst bed, and therefore if the outlet temperature set point were, for example, 720° F., the temperature of a gas stream with low solvent vapor concentration would be close to the desired 700°–720° F. range during its entire flow through the catalyst bed. However, a gas stream with a substantially higher solvent concentration would undergo a much greater temperature rise in its flow through the catalyst bed, and maintenance of the 720° F. outlet temperature would require the temperature at the inlet to be so much lower than 720° F. that temperatures in the catalyst bed would not be high enough for proper incineration except in a zone very close to its outlet, with the result that there would be incomplete combustion of solvent vapors.

Controlling the temperature of the gas stream at the inlet to the catalyst bed by monitoring the temperature of the gas at some intermediate point in its flow through the bed is likewise impractical. The catalyst bed has a relatively short length in the direction of stream flow, but has a relatively large cross-section transverse to that direction so that the gas stream velocity through the bed is relatively low. The problem of suitably locating a monitoring sensor at a point between the inlet and the outlet of the catalyst bed would be complicated not only by criticality due to the short flow length but by the fact that gas temperature rises relatively rapidly just inside the inlet to the catalyst bed and then rises more slowly during the course of flow through the remainder of the bed. Furthermore, at any given distance from the inlet to the catalyst bed, temperature tends to vary from point to point around the bed, due to temperature distribution conditions that depend upon aging of the catalyst and flow conditions (turbulence) within the bed that vary with gas flow velocity.

The problem of controlling the temperature of the gas stream at the inlet to the catalyst bed is further complicated by the characteristics of the fan or exhaust blower by which the gas is drawn out of the dryer and propelled through the fuel burner and the catalyst bed. The centrifugal type of blower conventionally used for this purpose tends to pump air or other gas at a fixed volume flow rate, regardless of density of the gas, and therefore the mass flow rate through the blower (which can be expressed in pounds of gas per unit of time) varies with the temperature of the gas at the blower, decreasing as that temperature rises.

It has heretofore been conventional to locate the exhaust blower close to the dryer, to suck gas out of the dryer and blow it through the primary heat exchanger, the fuel burner and the catalyst bed. Since the gas in the dryer is at a relatively constant temperature, this location of the blower assured a fairly constant flow of air from the dryer. However, it is desirable that air mass flow rates through the dryer be increased at times of increased vapor concentration, to ensure that vapor concentration in the gas stream and in the vicinity of the dryer will be maintained well below the explosive level and to increase the difference in pressure between the atmosphere and the interior of the dryer (which is normally at subatmospheric pressure) to prevent any possibility of solvent vapors being belched out of the dryer enclosure.

If the exhaust fan were located downstream from the catalyst bed, changes in vapor concentration would bring about rather substantial changes in the rate at which gas would be drawn out of the dryer and through the bed, but such changes in rate of gas flow would be in the wrong direction. With higher vapor concentrations, the gas stream issuing from the catalyst bed is normally hotter than with low concentrations and therefore has less density; consequently, mass flow rate through a blower located downstream from the catalyst bed would decrease at just those times when it should be increased.

SUMMARY OF THE INVENTION

The general object of the present invention is to provide a highly efficient system for incinerating solvent vapors mixed in air drawn out of a dryer such as the dryer for a freshly imprinted web, which system comprises a catalyst bed through which the gas stream comprising the mixed air and solvent vapors is passed after being preheated by means of a fuel burner and/or a heat exchanger.

More specifically, it is an object of the invention to provide a combustible vapor incineration system of the character just described that has automatic control apparatus whereby the temperature of the gas stream at the inlet to the catalyst bed is automatically so controlled as to ensure complete incineration of solvent vapors in the course of flow of the gas stream through the catalyst bed but nevertheless prevent the gas stream that has been passed through the bed from being hotter than necessary, such control thus compensating for substantial variations in vapor concentration in the gas stream.

Another specific object of the invention is to provide a combustible vapor incineration system of the character described whereby mass flow of air from a dryer that constitutes a source of solvent vapors is automatically increased at times when solvent concentrations are high.

A further and more general object of the invention, achieved by reason of achievement of the last stated object, is to provide a solvent vapor incineration system comprising a catalyst bed, wherein there is an inherent tendency for a stable temperature to be maintained at the outlet from the catalyst bed inasmuch as mass flow rate through the bed tends to increase with increasing vapor concentrations in the gas stream, and wherein there is also an inherent tendency for the weight of air per unit time that is drawn out of the dryer to increase with increasing vapor concentrations.

Another object of the invention is to provide an incineration system of the above described character wherein heated air containing oxidized solvent vapors can be passed through a heat exchanger, in heat exchange relation to incoming "dirty" gas containing unoxidized solvents, and wherein any leakage in the heat exchanger will result in clean air being drawn into the dirty air instead of the undesirable reverse.

In general, these objects of the invention are realized in apparatus for incinerating combustible vapors that are mixed with air to comprise a gas stream of variable vapor concentation, which apparatus comprises controllable heating means and a catalyst bed having an inlet and an outlet and to which the gas stream is conducted from said heating means for oxidation of the vapors, monitoring means responsive to conditions in the gas stream for producing control inputs, and control means connected with the monitoring means to receive control inputs therefrom, said control means being operatively associated with said heating means to regulate the heat output thereof in accordance with said control inputs. A characterizing feature of the apparatus of the present invention is that its monitoring means comprises a pair of temperature sensors, each of which produces a temperature output having a magnitude that varies with the temperature at the sensor, and one of said sensors is located to sense the temperature of the gas stream at the catalyst bed inlet while the other is located to sense the temperature of the gas stream at the catalyst bed outlet. The apparatus is further characterized by averaging means to which the temperature outputs of both of said sensors are delivered, said averaging means being arranged to produce an output having a magnitude corresponding to a predetermined function of the temperature outputs of both of said sensors. Preferably the averaging means is adjustable so that its output can correspond to a weighted average of the temperature outputs of the two sensors, with more weight selectably given to one of those outputs than to the other.

Apparatus embodying the invention will ordinarily comprise duct means whereby the gas stream is conducted successively to the heating means and to the inlet of the catalyst bed, and a fan having a constant volume flow rate whereby the gas stream is moved through said duct means and the catalyst bed. The apparatus of this invention is further characterized by said fan being located in the duct means between the heating means and the inlet to the catalyst bed so that the gas stream has substantially the same temperature at the fan as at said inlet and therefore the mass flow rate of gas through said fan increases with decreasing temperature of the gas stream at said inlet.

BRIEF DESCRIPTION OF DRAWING

The accompanying drawing, which depicts what is now regarded as a preferred embodiment of the invention, is a schematic flow diagram of a catalytic incineration system for solvent vapors embodying the principles of the present invention, shown in conjunction with a conventional dryer for a single web.

DETAILED DESCRIPTION OF PREFERRED EMBODIMENT OF THE INVENTION

In the accompanying drawing, a freshly imprinted web W is shown passing through a dryer enclosure, designated generally by 3, wherein combustible hydrocarbon solvents are evaporated from the ink that has been deposited on the web. As it moves through the dryer 3, the web W is contactlessly supported by a known arrangement of air nozzles 4 from which air is blown against the web. The air, which is forced into the nozzles 4 by a supply air fan 5, is heated at a combustion burner 6 before being delivered to the nozzles, so that as it issues from the nozzles in high velocity streams it not only supports the web W but also promotes solvent evaporation.

A substantial portion of the air delivered to the nozzles 4 is air that the supply air fan 5 has withdrawn from the dryer enclosure 3 through a recirculation duct 7. As explained hereinafter, an exhaust fan 30 draws air mixed with solvent vapor out of the dryer enclosure 3, through duct means 8, at a rate such as to maintain a subatmospheric pressure in the interior of the dryer. A small amount of make-up air, along with combustion gases, is added to the flow into the nozzles 4 by the combustion burner 6, which comprises a blower 6a that draws combustion air from the atmosphere. A substantially larger portion of make-up air is fed directly into the dryer enclosure 3 by a make-up air fan 9 that has its inlet at a smoke hood 10 located over a chill stand 11. The chill stand 11 serves for cooling the web W immediately after it leaves the dryer 3, and the air drawn into the smoke hood 10 is mixed with solvent vapors that are emitted at the chill stand.

In its opposite end portions the dryer enclosure 3 has narrow slots 12 and 13 through which the web W respectively enters and leaves the dryer enclosure and which are substantially wider than the web thickness, so that the web surfaces will not contact their edges. The slots 12 and 13 therefore serve as inlets through which so-called infiltration air, as denoted by arrows 14, is drawn into the dryer enclosure by the subatmospheric pressure therein, to prevent solvent vapors from being belched out of the dryer.

The gas stream consisting of mixed air and solvent vapors that has been drawn into the duct means 8 is first conducted to heating means, designated generally by 16, whereby the gas is heated to a temperature which is generally below the normal kindling point of its vapor component, and the gas is thence conducted to the inlet 18 of a catalyst bed 17. The gas stream must be heated before it is introduced to the catalyst bed 17, in order to enable complete oxidation of the vapors to take place in the course of its flow through the catalyst bed; but because of the relatively low temperature to which the gas stream is heated, such heating consumes little fuel, and the process is an energy-efficient one.

Because of the exothermic oxidation process that takes place in the catalyst bed 17, the gas stream at the outlet 19 from that bed usually has a higher temperature than the gas stream at its inlet 18. For useful recovery of its heat content, the gas stream leaving the catalyst bed 17 is first passed through the hot side 121 of a primary heat exchanger 21 that comprises a part of the heating means 16, and there the hot gas flows in indirect heat exchange with the gas stream flowing towards the catalyst bed. Thereafter, the gas from the catalyst bed is passed through the hot side 122 of a secondary heat exchanger 22, wherein it flows in indirect heat exchange with air flowing towards the dryer 3. In the illustrated apparatus, the air that is passed through the cold side 222 of the secondary heat exchanger 22 is make-up air that is drawn in through the smoke hood 10, propelled by the make-up fan 9.

The gas stream that has passed through the hot sides 121 and 122 of the primary heat exchanger 21 and the secondary heat exchanger 22, respectively, is discharged through an outlet 24 into the atmosphere, which it enters at a relatively low temperature and as a harmless exhaust consisting essentially of air, carbon dioxide and water vapor.

Turning now to the heating means 16 that heats the gas drawn out of the dryer 3 before that gas is delivered to the catalyst bed 17, such heating means comprises, in general, the primary heat exchanger 21 and a controllable fuel burner 25, sometimes referred to in the art as an afterburner because it heats the gas after it has been used for the drying process. The afterburner 25 is arranged to discharge its combustion gases directly into the gas stream flowing towards the catalyst bed 17.

Under some circumstances the incoming gas stream can pick up enough heat at the primary heat exchanger 21 to allow the controllable fuel burner 25 to be operated at low heat output or to be shut down entirely. There may also be times when the temperature of the gas at the inlet 18 to the catalyst bed 17 would be higher than necessary if all of the incoming gas were passed through the primary heat exchanger 21, even with the fuel burner 25 shut off. Hence, to provide for flexibility in control of the temperature of the gas stream at the inlet 18 to the catalyst bed 17, while also providing for optimum recovery of heat from gas which issues from that bed, there is an adjustable bypass damper 27 at the inlet to the cold side 221 of the primary heat exchanger 21, whereby some of the incoming gas stream, or all of it, or none of it, can be bypassed around that heat exchanger 21 through a bypass duct 28.

The position of the bypass damper 27 is controlled by automatic control means 29 which is described hereinafter and which also controls the controllable fuel burner 25. In general, the control means 29 operates in such a manner that whenever incoming gas is being bypassed around the primary heat exchanger 21 through the bypass duct 28, the fuel burner 25 is either caused to operate at low output or is shut off completely, thus maintaining fuel consumption at the lowest rate consistent with complete oxidation of the solvent vapor content of the gas stream.

As will appear hereinafter, the operation of the control means 29 is further such that the temperature of the gas stream at the inlet 18 to the catalyst bed 17 is generally lower at high vapor concentrations and higher at low vapor concentrations; and this fact is significant with respect to the location of the exhaust fan 30 by which the gas stream of mixed air and solvent vapors is drawn out of the dryer 3 through the duct means 8, to be successively propelled through the heating means 16, the catalyst bed 17 and the hot sides 121 and 122 of the respective heat exchangers 21 and 22. Specifically, the exhaust fan or blower 30 is located ahead of the inlet 18 to the catalyst bed 17 but downstream from the heating means 16.

The exhaust blower 30, as is conventional, is of the centrifugal type, and therefore there is a constant volummetric flow rate through it (measured, for example, in cubic feet of gas per minute), but the mass flow rate through it (measured, for example, in pounds of gas per minute) varies with temperature, decreasing with increasing temperature and vice versa. Since the temperature of the gas stream at the exhaust blower 30 is essentially the same as at the inlet 18 to the catalyst bed 17, and is controlled to compensate for changes in its vapor concentration, mass flow through the blower 30 is higher at high vapor concentrations, owing to the lower temperatures then maintained at the catalyst bed inlet 18. Hence, an increased vapor concentration in the gas stream results in an increased number of pounds of air per unit time being drawn through the dryer 3, so that, in effect, the increased quantity of solvent vapors is partially offset by increased dilution of the solvent vapors, and there is a tendency towards maintenance of a stable, constant vapor concentration.

One consequence of the tendency towards increased mass flow rate with increased vapor concentration is that vapor concentrations in the dryer 3 remain well below the explosive level. Another is that there is a reduced possibility for solvent vapors to be belched out of the dryer enclosure. Still another is that with an increased mass of air to be heated during oxidation of a given mass of solvent, there is a lower temperature rise in the catalyst bed than would occur if vapor concentration increased without an increase in the mass flow rate of the air in which the vapor is carried.

It is also noteworthy that the gas stream through the hot side 121 of the primary heat exchanger 21 is clean gas and is somewhat pressurized by the exhaust blower 30, whereas the untreated gas flowing through the cold side 221 of the primary heat exchanger is being drawn towards the blower 30 and is therefore at a lower pressure. As a result of this relationship, if there is any leakage in the primary heat exchanger 21, clean, treated gas will be drawn into the "dirty" gas flowing towards the catalyst bed, rather than dirty leakage gas being discharged through the exhaust outlet 24.

As pointed out hereinabove, the heating means 16 cannot be controlled to maintain either a fixed temperature of the inlet 18 of the catalyst bed 17 or a fixed temperature at its outlet 19. However, on the basis of temperatures at both the inlet 18 and the outlet 19, the heating means 16 can be so controlled that the temperature of the gas stream at the inlet 18 is always high enough to ensure complete oxidation of solvent vapors in the course of flow of the gas stream through the catalyst bed but is never so high that the gas at the outlet 19 will be unecessarily hot.

Thus, according to the present invention, the heating means 16 is so controlled as to maintain a constant value for a weighted average of gas temperatures at the catalyst bed inlet 18 and at the catalyst bed outlet 19. In theory, that weighted average corresponds to a temperature at some point within the catalyst bed 17 that is spaced from both its inlet 18 and its outlet 19.

Since the control means 29 must function in response to conditions in the gas stream, it receives an input from monitoring means comprising a pair of temperature sensors 38 and 39 and averaging means 32. The sensor 38 detects the temperature of the gas stream at the catalyst bed inlet 18; the sensor 39 detects temperature at the outlet 19. Each of the temperature sensors 38 and 39 can comprise a thermocouple, a thermistor or a similar device that produces an electrical temperature output having a magnitude that varies in accordance with temperature at the sensor. Thermocouples are preferred. The sensor 38 can be located, according to convenience, at or just ahead of the inlet 18 to the catalyst bed, but preferably downstream from the exhaust fan or blower 30. The sensor 39 is likewise located, as convenient, at or near the outlet 19 from the catalyst bed but in any case upstream from the primary heat exchanger 21.

Like terminals of the two sensors 38, 39 are connected with respective input terminals of averaging means 32 whereby the temperature outputs of the two sensors are employed to produce a combined value output having a magnitude that is a function of both of their temperature outputs. This is to say that the combined value output which is a function of the sum of the temperatures to which the sensors 38 and 39 are responding.

Preferably the averaging means 32 comprises a potentiometer or adjustable resistance device having a resistance element 33 connected between its input terminals and having a slider 34 contacting the resistance element and adjustably shiftable along it. The combined value output is taken off of the slider 34, which is connected to an input terminal of the control means 29.

The emf developed by each of the thermocouples 38, 39 is approximately proportional to the temperature that it senses (in relation to the temperature at its cold junction), and therefore, since the impedance of the control means 29 is very high, the combined value output of the averaging means 32 is given by:

$$V = \frac{r2}{r1 + r2} T1 + \frac{r1}{r1 + r2} T2,$$

where T1 and T2 represent the temperatures (above the cold junction) at the thermocouples 38 and 39, respectively; r1 is the value of resistance interposed between the thermocouple 38 and the slider 34; and r2 is the value of resistance interposed between the thermocouple 39 and the slider 34.

In effect, therefore, the combined value signal fed to the control means 29 has a magnitude that corresponds generally to a function of the sum of the two temperatures T1 and T2 at the inlet 18 and outlet 19, respectively, of the catalyst bed and corresponds specifically to a weighted average of those two temperatures. As the slider 34 is adjusted to interpose increasing resistance in series with either thermocouple 38 or 39, the weight given to the temperature at that thermocouple is decreased while the weight given to the temperature at the other thermocouple 39 or 38 is correspondingly increased. Thus, if the slider 34 is so adjusted that there is effectively no resistance in series with the sensor 38, and 100 percent of the resistance is in series with the sensor 39, the combined value input to the controller 29 will substantially correspond to the temperature at the catalyst bed inlet 18, whereas in the opposite extreme position of the slider 34 the input to the controller will substantially correspond to the temperature at the outlet 19.

The control means 29 comprises apparatus of a known type whereby the combined value output from the averaging means 32 is compared with a set point magnitude or demand value, produced in any suitable manner, as exemplified by a demand value generator 36. The demand value or set point magnitude could be adjustable, but it is conveniently a fixed value, especially in view of the provision for adjustability that comprises the slider 34.

The control means 29 comprises a comparison device 37 which receives as inputs the set point magnitude (as from the demand value generator 36) and the combined value output from the averaging means 32. If the combined value output is lower than the set point magnitude, signifying that gas temperature is too low at the inlet 18 and/or the outlet 19 of the catalyst bed, the comparison device 37 produces an "increase heat" output; conversely, if the combined value output is higher than the set point magnitude, the comparison device produces a "decrease heat" output. These outputs are respectively symbolized by output terminals 41 and 42 of the comparison device.

The control means 29 also comprises sequencing means 43 and 44, symbolized as connected with the respective output terminals 41 and 42, through which the control outputs from the comparison device 37 are fed to the servo 44a for the afterburner and the servo 45 for the bypass damper 27. The sequencing means 43, 44 can comprise switches that are mechanically actuated by the respective servos 44a, 45 of the heating means 16, or can comprise other devices of a character that will be familiar to those skilled in the art, whereby the servos 44a and 45 are caused to operate alternately and in accordance with the following described program.

Let is first be assumed that vapor concentration has been very low and that the apparatus has been operating with the bypass damper 27 closed, so that all incoming gas flows through the primary heat exchanger 21, and with the afterburner 25 at full output. With an increase in vapor concentration, resulting in a rise in temperature at the sensor 39, there will be a "decrease heat" output from the comparison device 37, manifested at its terminal 42. Through the sequencing means 44, this output will first be applied to the throttle servo of the afterburner 25, to turn down that fuel burner to its minimum heat output setting. If the requirement for decreased heat persists after the burner throttle has been positioned for minimum heat, the "decrease heat" output is next applied to the servo 45 for the bypass damper 27, causing the damper to open to such an extent that a predetermined portion of the incoming gas stream is bypassed around the primary heat exchanger 21, through the bypass duct 28. If, then, the requirement for decreased heat still persists, the fuel burner 25 is turned off completely. Finally, a further persisting "decrease heat" output is applied to so position the bypass damper 27 as to bypass more of the incoming gas around the primary heat exchanger 21 through the bypass duct 28.

Assuming that the last described extreme condition is followed by a decrease in vapor concentration in the gas stream, the control means will issue an "increase heat" output, and the system can function in the reverse of the sequence just described, to the extent necessary to hearing the gas just enough to ensure substantially complete oxidation of its vapor content in the course of flow through the catalyst bed. Preferably, instead of the "increase heat" sequence being the exact reverse of the "decrease heat" sequence, the bypass damper 27 is completely closed before the afterburner 25 is started.

Upon initial start-up of the apparatus, the position of the slider 34 is adjusted on an empirical basis, to accommodate conditions of temperature and gas flow in the catalyst bed that are substantially unpredictable. Readjustment of the slider 34 may be necessary from time to time to compensate for aging of the catalyst and other factors. Such readjustment will normally be needed only occasionally, as a matter of maintenance of the apparatus, and not as a routine operating procedure.

From the foregoing description taken with the accompanying drawing it will be apparent that this invention provides simple but very efficient apparatus for solvent vapor incineration, wherein a gas stream comprising air mixed with combustible solvent vapor is heated and then delivered to a catalyst bed in which oxidation of the solvent vapors takes place, said apparatus being arranged to effect increased withdrawal of air from the solvent vapor source when the vapor concentration of the gas increases, and having control means whereby the temperature of the gas arriving at the inlet to the catalyst bed is efficiently maintained high enough for complete oxidation of its solvent content during flow therethrough but low enough to avoid an unecessarily high temperature at the outlet from the catalyst bed.

I claim:

1. Apparatus comprising a dryer at which solvent vapors are released and from which they are collected in a gas stream of varying vapor concentration, a catalyst bed having an inlet and an outlet and through which said gas stream is passed for oxidation of its vapor content, controllable heating means for producing a controllably variable heat output, duct means for conducting the gas stream from the dryer successively to said heating means and the inlet of the catalyst bed so that the gas stream can reach said inlet at a temperature high enough for substantially complete oxidation of its vapor content in the catalyst bed, and a constant volume fan by which the gas stream is drawn out of the dryer and caused to flow through the duct means and the catalyst bed, said apparatus being characterized by:

A. a pair of temperature sensors, each of which produces a temperature output that varies with temperature at the sensor,
       (1) one located to respond to the temperature of the gas stream substantially at the inlet of the catalyst bed, and
       (2) the other located to respond to the temperature of the gas stream substantially at the outlet of the catalyst bed;
    B. control output means comprising
       (1) summing means connected with both of said sensors for producing a combined output having a magnitude corresponding to a function of the sum of the temperatures to which said sensors are responding,
       (2) a demand value generator for producing a demand value output having a magnitude comparable with said combined output, and p2 (3) comparison means connected with said summing means and with said demand value generator and whereby a control output is produced that has a magnitude dependent upon the relationship between said combined output and said demand value output; and
    C. control means for said heating means, connected with said control output means to receive the output thereof and whereby the heat output of said heating means is so controlled as to tend to maintain said magnitude of said control output substantially constant.

2. The apparatus of claim 1, further characterized by:
said fan being located in said duct means between said heating means and the inlet to the catalyst bed so that the gas stream has substantially the same temperature at said fan as at said inlet and therefore the mass flow rate of gas through said fan increases with decreasing temperature of the gas stream at said inlet.

3. The apparatus of claim 1, further characterized by:
said controllable heating means comprising
 (1) a controllable fuel burner,
 (2) a heat exchanger wherein hot gas that has passed through said catalyst bed can pass in heat exchange relation with gas flowing towards said fuel burner, and
 (3) means for controlling the heating effect of said heat exchanger upon gas flowing towards said fuel burner, the last mentioned means comprising
  (a) a bypass duct through which gas can flow directly towards said fuel burner in bypassing relation to said heat exchanger and
  (b) controllable damper means for proportioning the relative quantities of gas that flow through said heat exchanger and said bypass duct.

4. The apparatus of claim 1 wherein each of said sensors comprises a thermocouple, further characterized by:
said summing means
 (1) having a pair of input terminals, one for each sensor, that are connected with like terminals of the respective sensors and
 (2) having an output terminal,
said summing means comprising adjustably variable resistance means connected with said input terminals and said output terminal for delivery to the latter of said summing output.

5. The apparatus of claim 4 wherein said adjustably variable resistance means of the summing means comprises:
 (1) a resistance element connected between said input terminals of the summing means and
 (2) a slider contacting said resistance element and connected with the output terminal of the summing means.

6. Apparatus for incinerating combustible vapors mixed with air as a gas of variable vapor concentration, said apparatus comprising a catalyst bed having an inlet and an outlet and through which the gas is passed for oxidation of the vapors, controllable heating means whereby the gas flowing to said inlet is heated to a temperature at which complete oxidation of the vapors can be effected in the catalyst bed, duct means for conducting the gas to said heating means and thence to said inlet, and monitoring means responsive to conditions in the gas for producing inputs which depend upon vapor concentration in the gas and which are employed for control of said heating means, said apparatus being characterized by:
A. said controllable heating means comprising
 (1) a fuel burner selectively adjustable to each of an "off" setting in which the fuel burner is not operating, a minimum heat output setting, and at least one other setting at which the burner operates with higher than minimum heat output;
 (2) a heat exchanger having
  (a) a cold side through which gas can pass in flow towards said inlet and
  (b) a hot side connected with said outlet and through which hot gas issuing from the catalyst bed can flow in heat transfer relation to gas passing through said cold side;
 (3) a bypass duct through which gas can flow in bypassing relation to the cold side of said heat exchanger; and
 (4) adjustable damper means for controlling the proportions of gas flowing towards said inlet that respectively pass through said cold side of the heat exchanger and said bypass duct, said damper means having a closed position in which it constrains substantially all gas flowing to said inlet to pass through said cold side; and
B. control means operatively associated with said fuel burner and said adjustable damper means and to which said inputs are delivered, said control means being arranged
 (1) to maintain said damper means in its closed position whenever the fuel burner is operating and is at other than its minimum heat output setting and
 (2) to maintain the fuel burner in its "off" setting whenever said damper means is open beyond a predetermined extent.

7. The apparatus of claim 6, further characterized by:
C. said duct means being arranged to conduct gas to the fuel burner from both said bypass duct and said cold side of the heat exchanger, and from said fuel burner to said inlet.

8. The apparatus of claim 7, further characterized by:
D. a constant-volume fan for causing gas to flow through said duct means, said fan being connected in said duct means between the fuel burner and the inlet to the catalyst bed.

* * * * *